(12) United States Patent  (10) Patent No.: US 8,896,770 B2
Im  (45) Date of Patent: Nov. 25, 2014

(54) MOBILE TERMINAL

(75) Inventor: Jongin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 13/444,775

(22) Filed: Apr. 11, 2012

(65) Prior Publication Data

US 2012/0262397 A1  Oct. 18, 2012

(30) Foreign Application Priority Data

Apr. 12, 2011 (KR) .......................... 10-2011-0033939

(51) Int. Cl.
| | | |
|---|---|---|
| *G02F 1/1335* | (2006.01) | |
| *H04M 1/00* | (2006.01) | |
| *G02F 1/1343* | (2006.01) | |
| *G02F 1/1339* | (2006.01) | |
| *G06F 3/041* | (2006.01) | |

(52) U.S. Cl.
CPC ...................................... *H04M 1/00* (2013.01)
USPC ............. 349/12; 349/149; 349/150; 349/152; 349/153; 345/173; 178/18.01

(58) Field of Classification Search
CPC ... G02F 3/033; G02F 1/13452; G02F 1/1345; G02F 1/13454; G02F 1/13458; G02F 1/1333; G02F 1/1339; G02F 1/13338; G06F 3/033; G06F 3/041; G06F 3/0412; G06F 3/0416; G06F 3/044; G06F 3/045; G06F 3/047; G06F 3/03545; G06F 3/046; G06F 3/0488; G06F 3/042; G06F 3/043; G06F 3/0421; G06F 3/0354; G06F 3/03547; G06F 2203/04104; G06F 2203/04111; G06F 2203/04113; G06F 2212/171; H01L 2224/48247; H01L 23/49816; H01L 23/49838; H01L 2224/4824; H01L 2224/73253; H01L 24/81; H01L 23/50; H01L 24/49; H01L 24/83; H01L 2224/73215; H01L 2224/83192; H01L 2224/73203; H01L 2224/49109; H01L 2224/85; H01L 23/49811; H01L 2225/0651; H01L 2225/06517
See application file for complete search history.

(56) References Cited

U.S. PATENT DOCUMENTS

| | | | |
|---|---|---|---|
| 6,346,932 B1 * | 2/2002 | Maeda ............................ | 345/90 |
| 2009/0086114 A1 * | 4/2009 | Higuchi et al. .................. | 349/12 |
| 2010/0066650 A1 * | 3/2010 | Lee et al. ........................ | 345/64 |

* cited by examiner

*Primary Examiner* — Bumsuk Won
*Assistant Examiner* — Angela Davison
(74) *Attorney, Agent, or Firm* — Lee, Hong, Degerman, Kang & Waimey

(57) ABSTRACT

A mobile terminal is provided. The mobile terminal has a main body with a window; a display area having a first substrate configured to couple the window on a first face and couple a touch detection unit on a second face, a second substrate configured to face the first substrate, and a liquid crystal layer arranged between the second substrate and the touch detection unit; an exposed area configured to have at least one end extend in a lateral direction beyond the display area and electrically connect to a circuit board; and a first contact point and a second contact point each arranged between the display area and the exposed area.

18 Claims, 4 Drawing Sheets

MOBILE TERMINAL

CROSS REFERENCE TO RELATED APPLICATIONS

Pursuant to 35 U.S.C. §119 (a), this application claims the benefit of earlier filing date and right of priority to Korean Patent Application No. 10-2011-0033939, filed on Apr. 12, 2011, the contents of which are all hereby incorporated by reference in its entirety.

BACKGROUND OF THE INVENTION

1. Field of the Invention

The present invention relates to a mobile terminal capable of detecting a touch input.

2. Description of the Related Art

In general, terminals may be mobile terminal or stationary based on whether they can be moved. Mobile terminals may be handheld or vehicle-mounted based on whether a user can carry or use it outside of a vehicle. A mobile terminal can support complicated functions, such as capturing images or video, reproducing music or video files, playing games, receiving broadcast signals, among other similar functions. By comprehensively and collectively implementing such functions, the mobile terminal may be embodied in the form of a multimedia player or device.

Efforts to support and increase the functionality of mobile terminals include improvements to software, hardware and structural components that form the mobile terminal. A structural improvement to terminals may include an improvement to the performance and structure of a signal transmission mechanism in relation to a touch sensor. A current signal transmission mechanism generally has a structure comprising a circuit board and a touch sensor electrically connected by a flexible printed circuit board (FPCB) and a driver integrated circuit mounted on the FPCB. This structure, however, may require connection structures for electrically connecting to a common electrode constituting a liquid crystal display and for electrically connecting to electrodes constituting a touch sensor. The need for such connection structures may hinder a reduction in the physical size of terminals.

SUMMARY OF THE INVENTION

An objective of the present invention is to provide a mobile terminal with a unit comprising a simple structure for transmitting a signal to a display module.

As embodied and broadly described herein, the present invention provides, in one embodiment, a mobile terminal as follows: a terminal main body comprising a window; a display area comprising a first substrate configured to couple the window on a first face and couple a touch detection unit on a second face, a second substrate configured to face the first substrate, and a liquid crystal layer arranged between the second substrate and the touch detection unit; an exposed area configured to extend at least one end in a lateral direction beyond the display area and electrically connect to a circuit board; and a first contact point and a second contact point each arranged between the display area and the exposed area, wherein the first and second contact points are configured to electrically connect to a common electrode of the first or second substrate, wherein the second contact point is configured to electrically connect to at least a first or second electrode of the touch detection unit.

A plurality of color filter layers, each forming one pixel area, may be arranged between the touch detection unit and the liquid crystal layer. A black matrix layer may be formed between the color filters. A plurality of common electrodes may be positioned between the color filter layers and the liquid crystal layer. The first and second electrodes may be positioned to cross or overlap each other. Driver integrated circuits (ICs) may be positioned on the exposed area. A flexible printed circuit board (FPCB) may be formed to be electrically connected with the first and second contact points. The FPCB may include a touch IC formed to detect a signal or to apply a voltage to the first and second electrodes. The FPCB may be bifurcated from a point so as to be electrically connected with the driver ICs. A first insulating layer may be formed between the first and second electrodes. A second insulating layer may be formed between the second electrode and one or more subpixels. The first and second electrodes may comprise at least indium tin oxide (ITO), indium zinc oxide (IZO), or indium tin zinc oxide (ITZO).

As embodied and broadly described herein, the present invention provides in another embodiment a mobile terminal as follows: a mobile terminal comprising a first substrate and a second substrate arranged within a terminal main body and configure to face each other; a liquid crystal layer arranged between the first substrate and the second substrate; a touch detection unit coupled to the first substrate and arranged between the first substrate and the liquid crystal layer, wherein the touch detection unit comprises first and second electrodes arranged such that the first and second electrodes cross each other; and a contact point unit comprising a plurality of contact points configured to electrically connect to the touch detection unit and the first and second substrates.

Since the electrical connection structure between the display module and the terminal controller is simplified, the terminal can be reduced in size and the manufacturing costs can be reduced. Also, since the electrical connection structure between the contact point unit and the electrodes is integrated to simplify a signal transmission path, a touch input can be more accurately detected.

The scope of the present invention will become further apparent from the detailed description given herein. It will, however, be understood by one of ordinary skill in the art that the detailed description and any examples provided herein, while indicating preferred embodiments of the invention, are given for illustrative purposes only. One of ordinary skill in the arts will understand that various changes and modifications to the disclosed embodiments exist without deviating from the spirit and scope of the present invention.

BRIEF DESCRIPTION OF THE DRAWINGS

The present invention will become more fully understood from the detailed description given hereinbelow and the accompanying drawings, which are given for illustrative purposes only, and thus are not intended to limit of scope of the claimed invention.

DETAILED DESCRIPTION OF THE INVENTION

A mobile terminal according to certain alternative embodiments of the present invention will now be described with reference to the accompanying drawings. The singular expression of the present invention may include a plural concept unless defined differently. In the following description, usage of suffixes, such as 'module,' 'part' or 'unit' with reference to certain elements is given merely to facilitate explanation of the present invention without having any significant meaning by itself.

Mobile terminals described in the present invention may include mobile phones, smart phones, notebook computers, laptop computers, tablet computers, digital broadcast receivers, PDAs (Personal Digital Assistants), PMPs (Portable Multimedia Player), navigation devices, and other similar devices. However, it will be easily understood by one of ordinary skill in the art that the configuration according to the embodiments of the present invention can also be applicable to fixed types of terminals, such as digital TVs, desktop computers, or other similar devices.

Figure 1:
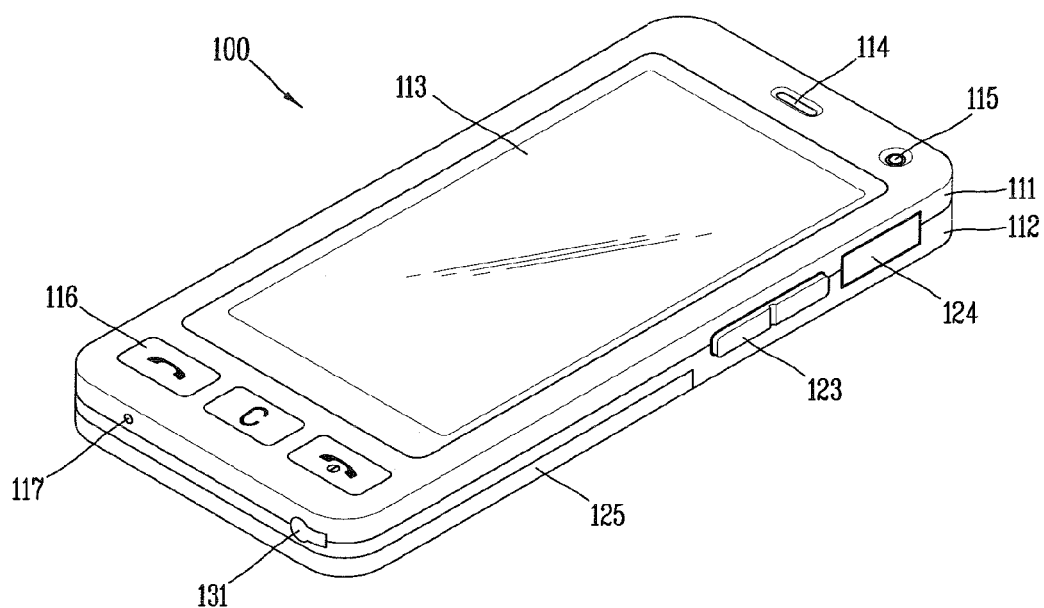
FIG. 1 is a front perspective view of a mobile terminal according to the present invention.

FIG. 1 is a front perspective view of a mobile terminal 100 according to the present invention. With reference to FIG. 1, a case (or casing, housing, cover, etc.) constituting an external appearance of a main body of the terminal is formed by a front case 111 and a rear case 112. Various electronic components are located in the space formed between the front case 111 and the rear case 112. One or more intermediate cases may additionally be positioned between the front case 111 and the rear case 112. The cases may be formed by injection-molding a synthetic resin or may be made of a metallic material such as stainless steel (STS) titanium (Ti), or other similar material.

A display unit 113, a first audio output unit 114, a first image input unit 115, a first manipulation unit 116, and an audio input unit 117, may be positioned on the front case 111. The display unit 113 may include a display module 200 (See FIG. 3), such as an LED (liquid crystal display) module, an OLED (organic light emitting diode) module, or other similar display module that visually displays information. The display unit 113 may be configured as a touch screen allowing a user to input information in a tactile manner.

The first audio output unit 114 may be implemented in the form of a receiver or a speaker. The first image input unit 115 may be implemented in the form of a camera module for capturing an image or a video of the user or for another similar function. The first manipulation unit 116 receives a command for controlling the operation of the mobile terminal 100 according to an exemplary embodiment of the present invention. The audio input unit 117 may be implemented, for example, in the form of a microphone in order to receive a user's voice or any other sound.

A second manipulation unit 123, an interface 124, or a power supply unit 125 may be positioned on the rear case 112 mounted on a rear side of the mobile terminal 100. The second manipulation unit 123 may be installed on the side of the rear case 112.

The second manipulation unit 123, together with the first manipulation unit 116, may be generally called a 'manipulating portion' and a scheme may be employed to allow the user to perform tactile manipulation.

For example, the manipulating portion may be implemented as a dome switch, a touch screen, or a touch pad that receives a command or information according to a user's push or touch manipulation. Alternatively, the manipulating portion may be implemented by a wheel for rotating a key, a jog type, a joystick, or other similar manipulating mechanism. In terms of functions, the first manipulation unit 116 may be used to input functions such as start, end, or other similar operational functions, and the second manipulation unit 123 may operate as a hot key for performing a particular function, such as activation of the first image input unit 115. When the first 116 and second 123 manipulation units are minimized, phone numbers, characters, or similar information, may be input through a touch screen provided on the display unit 113.

The interface 124 serves as a path to allow the mobile terminal 100 to exchange data with an external device (not shown). For example, the interface 124 may be at least a connection port for connecting an earphone to the mobile terminal 60 via a fixed or wireless means, a port (e.g., an Infrared Data Association (IrDA) port) for short-range communication, a Bluetooth™ port, a wireless LAN port, a power supply port that supplies power to the mobile terminal, or other similar connection mechanism. The interface 124 may be a card socket accommodating an external card, such as a Subscriber Identity Module (SIM), a User Identity Module (UIM), a memory card for storing information, or any other similar memory item.

A power supply unit 125 for supplying power to the mobile terminal 100 is mounted on the rear case 112. The power supply unit 125 may be a rechargeable battery.

Figure 2:
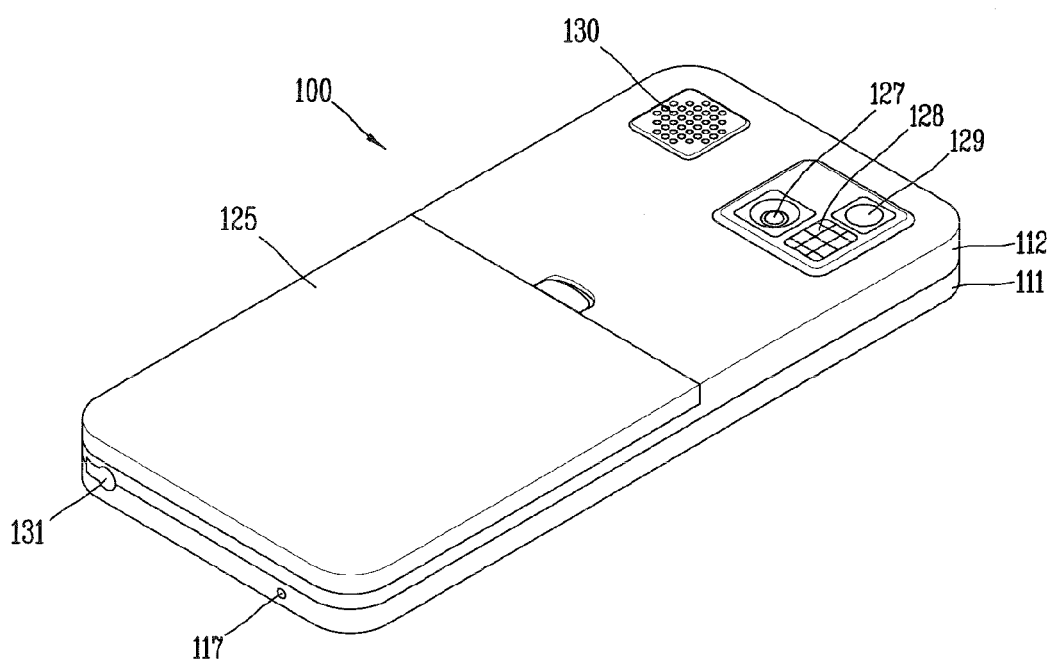
FIG. 2 is a rear perspective view of the mobile terminal in FIG. 1.

FIG. 2 is a rear perspective view of the mobile terminal 100 shown in FIG. 1. With reference to FIG. 2, a second image input unit 127, a second audio output unit 130 and a broadcast signal receiving antenna 131 may additionally be mounted on the rear case 112. The second image input unit 127 may have an image capture direction which is substantially opposite to that of the first image input unit 115 (See FIG. 1) and may be a camera supporting a different number of pixels than that of the first image input unit 115 (See FIG. 1).

For example, the first image input unit may be used for low resolution (i.e., supporting a relatively small number of pixels) for quick capture of an image (or video) and quick transmission to another device. The second image input unit 127 may be used for high resolution (i.e., supporting a relatively large number of pixels) for capture of more details (i.e. higher quality) in images (or video), which may not need to be transmitted quickly.

A flash 128 and a mirror 129 may additionally be positioned adjacent to the second image input unit 127. When an image of a subject is captured with the second image input unit 127, the flash 128 can further illuminate a subject. The mirror 129 allows a user to see himself/herself when he/she wants to capture his/her own image (i.e., self-image capturing) using the second image input unit 127.

The second audio output unit 130 may support stereophonic functions in conjunction with the first audio output unit 114 (See FIG. 1) and may also be used for sending and receiving calls in a speaker phone mode. The broadcast signal receiving antenna 131 may be positioned at one side of the rear case 112. The broadcast signal receiving antenna 131 may be installed such that it can be drawn out from the rear case 121.

The first manipulation unit 116 is positioned on the front case 111, and the second manipulation unit 123 is positioned on the rear case 112. Alternative embodiments exist; for example, the second manipulation unit 123 may be positioned to be adjacent to the first manipulation unit 116 on the front case 111. Further, even if the second image input unit 127 is not provided, the first image input unit 115 may be configured to rotate (or otherwise be moved) to allow image capturing in various directions.

Figure 3:
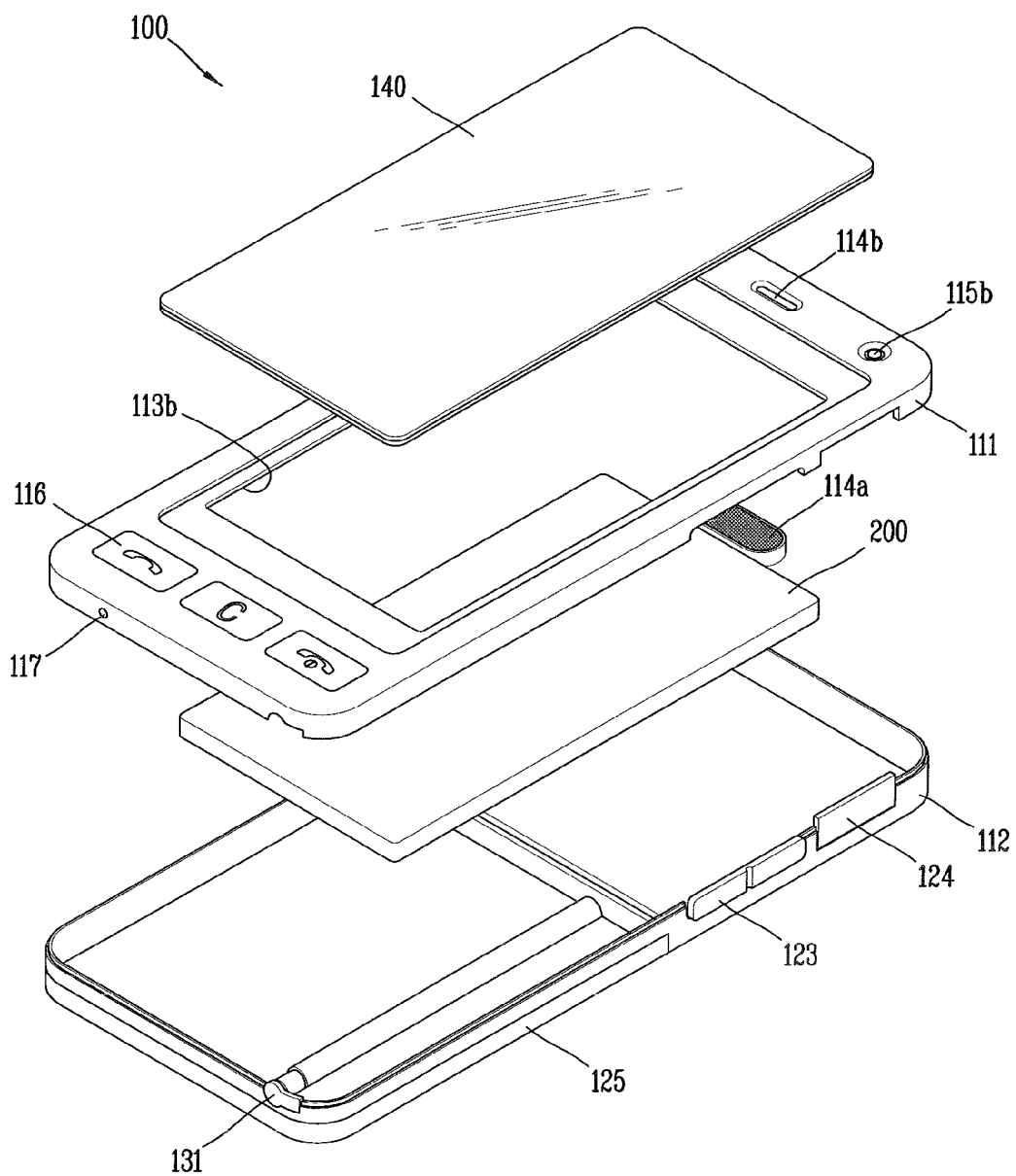
FIG. 3 is an exploded perspective view of the mobile terminal of FIG. 1.

FIG. 3 is an exploded perspective view of the mobile terminal of FIG. 1. With reference to FIG. 3, a window unit 140 is coupled to cover one face of the front case 111. The window unit 140 covers one face of the display module 200 to allow visual information output from the display module 200 to be recognized from the outside. The display module 200 and the window unit 140 constitute the display unit 113 (See FIG. 1).

The window unit 140 is adopted to recognize a user's touch and allow input of information (e.g., commands, signals or other similar information). The window unit 140 may have an area corresponding to the display module 200, and may be made of a material allowing light to be transmitted through it. The window unit 140 may have an opaque area substantially prohibiting light to be transmitted through it or having low light transmittance. For example, the window unit 140 may be surface-processed to prevent light from being transmitted through the edges of the window unit.

A manipulation pad may be formed on the front case 111 such that it corresponds to the first manipulation unit 116. The user may touch or press the manipulation pad. The manipulation pad may be formed as a manipulation area (not shown) at one portion of the window unit 140.

The front case 111 may include a sound hole 114b, a window hole 113b, and an image window (not shown). The sound hole 114b may be formed to correspond to the first audio output unit 114 to allow a sound, e.g., a bell sound, music, or any other sound, to be discharged to the outside of the mobile terminal 100. The window hole 113b may be formed to correspond to the display unit 113 (See FIG. 1).

A light-transmissive image window 115b may be formed to correspond to the first image input unit 115 (See FIG. 1). The display module 200, a speaker module 114a, a second image input unit 127 (See FIG. 2), and a switch (not shown) may be mounted on the rear case 112.

Figure 4:
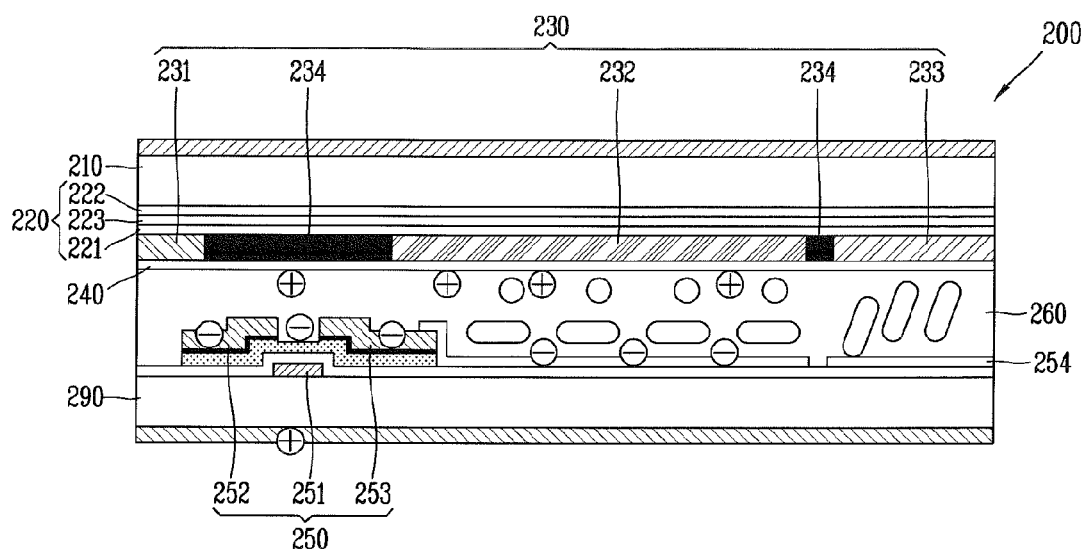
FIG. 4 is a cross-sectional view of a portion of a display module according to the present invention.
Figure 5:
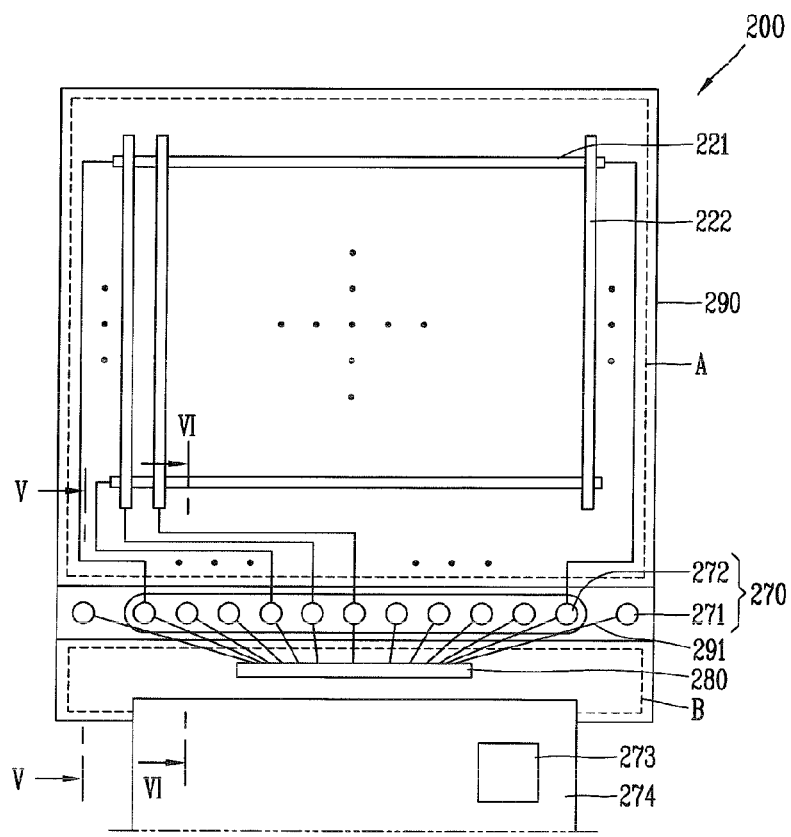
FIG. 5 is a plan view of a display module according to the present invention.
Figure 6:
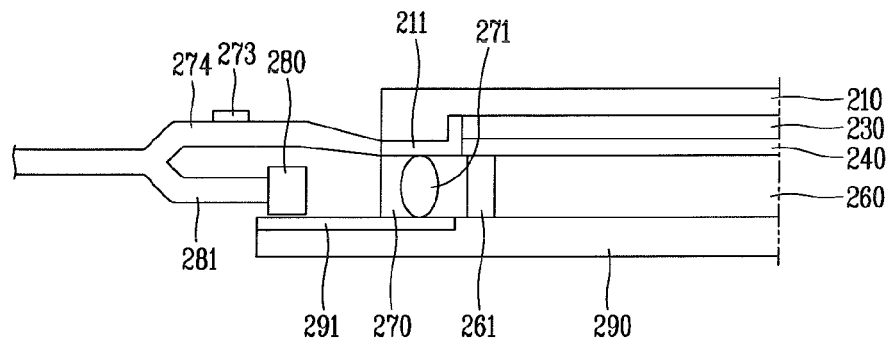
FIG. 6 is a sectional view taken along line V-V of FIG. 5.
Figure 7:
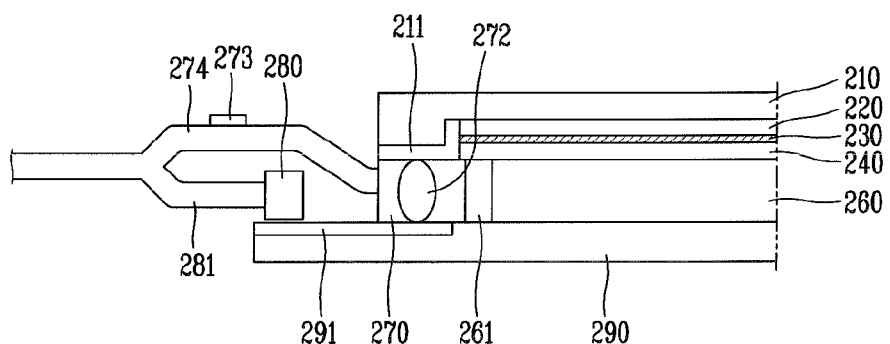
FIG. 7 is a sectional view taken along line VI-VI of FIG. 5.
Figure 8:
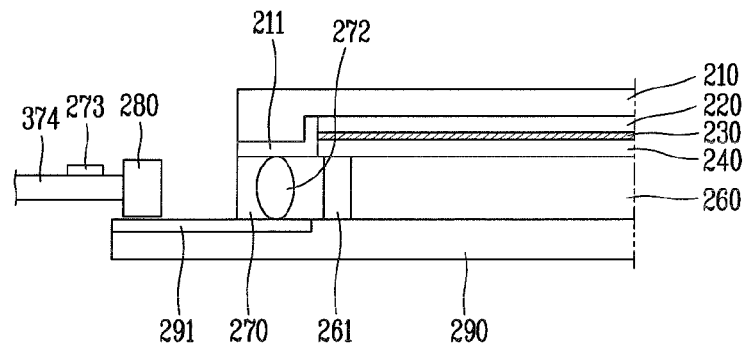
FIG. 8 is an alternative embodiment of the sectional view of FIG. 7.

FIG. 4 is a conceptual view showing a lamination structure of a portion of the display module 200 according to an embodiment of the present invention. FIG. 5 is a plan view of the display module 200 according to an embodiment of the present invention. FIG. 6 is a sectional view taken along line V-V of FIG. 5. FIG. 7 is a sectional view taken along line VI-VI of FIG. 5. FIG. 8 is an alternative embodiment of the section view of FIG. 7.

With reference to FIGS. 4 and 5, the display module 200 may include a first substrate 210, a second substrate 290, a touch detection unit 220 and contact point unit 270. The first 210 and second substrate 290 are positioned apart from each other. The touch detection unit 220 is positioned between the first 210 and second 290 substrates. The contact point unit 270 is electrically connected to at least the touch detection unit 220, first substrate 210 or second substrate 290.

A color filter array is formed by the touch detection unit 220, a black matrix layer 234, color filter layers 230 (i.e., 231, 232, 233), an overcoat layer (not shown) and common electrodes 240 formed on the entire surface of the overcoat layer. In the color filter layers 230, red 231, green 232, and blue 233 colors are sequentially repeated, and each color may correspond to a pixel area.

The second substrate 290 may include a thin film transistor array. The thin film transistor array may include a plurality of gate lines (not shown) and a plurality of data lines (not shown) crossing each other to define pixel areas, pixel electrodes 254 formed on the pixel areas, and thin film transistors 250 formed at the crossings of the gate lines and the data lines.

The touch detection unit 220 may include a plurality of first electrodes 221, second electrodes 222, and a first insulating layer 223. The plurality of first electrodes 221 may be formed to be spaced apart in an 'X' direction on the first substrate 210. The second electrodes 222 may be formed to be spaced apart in a direction crossing the first electrodes 221. The first insulating layer 223 may be formed between the first electrodes 221 and the second electrodes 222.

Each of the first electrodes 221 and the second electrodes 222 of the touch detection unit 220 are configured as transparent electrodes. The first insulating layer 223 may be configured as a transparent organic insulating layer in order to planarize an upper portion of the first electrodes 221.

The first insulating layer 223 may be configured to have a thickness ranging from 0.1 µm to 5 µm, to be transparent like photo-acryl, and to be formed as an organic layer having low permittivity. The first insulating layer 223 serves to smooth the surface after the first electrode 221 is formed. When not touched, the first insulating layer 223 prevents a load from increasing at the crossing of the first electrode 221 and the second electrode 222.

The first electrodes 221 are formed having a long bar shape in an X-axis directions. The second electrodes 222 are formed to cross the first electrodes 221 and have a long bar shape in a Y-axis direction. The first electrodes 221 and the second electrodes 222 may not have a bar-like shape and may be formed to have a regular pattern at an area excluding the crossing.

Any one of the first electrodes 221 or the second electrodes 222 may be formed such that the width of the crossing is smaller than the width of any other area of the crossing. This may reduce the load and better detect the capacitance between the first electrodes 221 and the second electrodes 222. The first electrodes 221 and the second electrodes 222 may be made of indium tin oxide (ITO), indium zinc oxide (IZO), or indium tin zinc oxide (ITZO).

A second insulating layer (not shown) formed between the touch detection unit 220 and the color filter layer may be omitted under certain circumstances. When the second insulating layer is provided, an upper portion of the second electrodes 222 can be planarized and the touch detection unit 220 and the common electrodes 240 formed on the color filter layers can be insulated. Accordingly, a touch detection operation of the first electrodes 221 and the second electrodes 222 can be prevented from affecting a vertical electrical field formed between the thin film transistor array and the common electrodes 240.

The first electrodes 221 or the second electrodes 222 may serve as driving electrodes to which voltage is applied, and the other remaining electrodes may serve as sensing electrodes for detecting a voltage signal. The remaining electrode (s) may be connected to the contact point unit 270, which may be formed at one side of the sensing electrodes.

The touch detection unit 220 applies a sequence of voltage signals to the plurality of driving electrodes. The sensing electrodes detect a voltage value and measures a change in the capacitance formed between the first electrodes 221 and the second electrodes 222 in order to detect whether and where on the display device a touch has occurred.

A polarizer or a cover glass may be formed on the first substrate 210. The first substrate 210 has durability with respect to pressure, and the polarizer or the cover glass may be omitted under certain circumstances. A liquid crystal layer 260 may be injected between the first substrate 210 and second substrate 290. A gap for injecting liquid crystal may be formed between the first substrate 210 and the second substrate 290, and a seal pattern 261 (see FIGS. 6-8) may be formed to prevent a leakage of injected liquid crystal.

As shown in FIGS. 5 through 7, the second substrate 290 includes a display area (A), in which a liquid crystal layer is positioned, and an exposed area (B), which is formed to extend in a lateral direction relative to the first substrate 210. Such a configuration exposes one face of the second substrate 290.

The first substrate 210 is not stacked on the exposed area (B). The contact point unit 270 is formed between the display area (A) and the exposed area (B), and the contact point unit is electrically connected to the common electrodes 240 and electrodes of the touch detection unit 220. The contact point unit 270 may be formed on an inner face of the first substrate 210.

The contact point unit 270 includes first contact points 271 electrically connected to the common electrodes. The contact point unit 270 also includes second contact points 272 electrically connected to the electrodes of the touch detection unit 220. The first 271 and second 272 contact points may be formed of silver (Ag) dots.

The first contact points 271 are provided to apply a common voltage (Vcom) supplied from an external circuit to the first substrate 210 through a common voltage connection wiring (not shown). The first contact points 271 may electrically connect the first 210 and second substrates 290. When the common voltage (Vcom) is applied from an external source, a scan voltage is applied to a gate electrode 251 of the thin film transistors (T) 250 of the second substrate 290 in order to turn on the thin film transistor.

A signal voltage flows from the source electrode 252 to the drain electrode 253 in the thin film transistors 250; such that the signal voltage is applied to the pixel electrode 254 connected to the drain electrode 253. An array of the liquid crystal molecules in the liquid crystal layer 260 drive the display module 200. The liquid crystal layer 260 is formed between the pixel electrode 254 of the first substrate 210 and the common electrodes 240 of the second substrate 290 due to the difference between the common voltage applied to the common electrodes 240 and the signal voltage of the pixel electrode 254.

As shown in FIGS. 6 and 7, a common voltage wiring 291 receiving a common voltage from the exterior is positioned on the second substrate 290, and the common electrodes 240 are positioned on the first substrate 210. The common electrodes 240 can be connected to the common voltage wiring 291 by the first contact points 271 formed on the common voltage wiring 291. Thereby, the common voltage can be applied to the common electrodes 240 through the first contact points 271.

The first electrodes 221 and the second electrodes 222 may be connected with the second contact points 272 by the connection wiring 211 formed on the first substrate. The second contact points 272 may be connected to a flexible printed circuit board (FPCB) 274 connected to a system controller for application of an electrical signal. A touch IC 273 may be formed on the FPCB 274 for applying a voltage signal to the first electrodes 221 or the second electrodes 222 or for controlling whether a voltage is detected.

As shown in FIG. 6, the FPCB 274 may be connected to the connection wiring 211. As shown in FIGS. 6 and 7, the FPCB 274 may be directly connected with the contact point unit 270 and bifurcated 281 from one point so as to be electrically connected to the plurality of driver ICs 280.

With reference to FIG. 5, the plurality of driver ICs 280 may be positioned on the exposed area B of the second substrate 290. The plurality of driver ICs 280 may be gate-driving unit driver ICs or source-driving driver ICs.

A gate-driving unit may include a plurality of individual gate-driver ICs. The gate-driving unit supplies shifted scan signals to the gate lines on the liquid crystal panel according to a gate control signal supplied from a timing controller unit. A source-driving unit may include a plurality of source-driver ICs.

The source-driving unit converts red, green and blue image data input from the timing controller into data voltage according to a data control signal. The source-driving unit also supplies the converted data voltage into data lines on the liquid crystal panel. The data voltage may be a gamma voltage comprising at least red, green or blue image data inputs.

The source driver IC or the gate driver IC may be mounted on a base film of a tape carrier package (TCP) and attached to the exposed area B of the second substrate 290 according to a tape automated bonding (TAB) scheme. Alternatively, the source driver IC or the gate driver IC may be directly mounted on the exposed area B of the second substrate 290 according to a 'chip on glass (COG) method.'

FIG. 8 is a sectional view of an embodiment of the display module 200 taken along line VI-VI of FIG. 5. The second substrate 290 is formed to extend in a lateral direction relative to the display area (A) on which a liquid crystal layer 260 is positioned. The second substrate 290 may include the exposed area (B) on which the first substrate 210 may not be stacked.

Unlike the embodiment of FIG. 7, in FIG. 8, an FCPB 374 may be directly connected to the plurality of driver ICs 280. The mobile terminal 100 in this configuration has a simplified structure in which the display module 200 and the controller of the terminal are connected. In this way, the mobile terminal 100 may be reduced in physical size and associated manufacturing cost.

According to the present invention, a touch detection operation may be performed as follows. When a voltage is applied in sequence to the first electrodes 221, the capacitance generated between the first electrodes 221 and the second electrodes 222 changes, and a change in current output from the second electrodes 222 is detected and interpreted as a touched portion. The sequential voltage application to the first electrodes 221 and the current detection in the second electrodes 222 are performed within one frame. In this way, one or more touches are simultaneously generated at several positions can be detected.

The exemplary embodiments described herein may be implemented in several forms without departing from scope and spirit of the present invention. It will also be understood that the above-described embodiments are not intended to limit any part of the presently claimed invention. The embodiments described herein should be construed as broadly as defined in the claims.

I claim:

1. A mobile terminal comprising:
   a terminal main body comprising a window;
   a display area comprising:
      a first substrate configured to accommodate the window on a first face and accommodate a touch detection unit on a second face,
      a second substrate configured to face the first substrate, and
      a liquid crystal layer arranged between the second substrate and the touch detection unit;
   an exposed area configured to:
      have at least one end extend in a lateral direction beyond the display area, and electrically connect to a circuit board; and a first contact point and two second contact points each arranged between the display area and the exposed area, wherein:

the first contact point and the two second contact points are configured to electrically connect to a common electrode of the first or second substrate; and the two second contact points are configured to electrically connect to at least a first or second electrode of the touch detection unit;

wherein the common electrode is connected to a common voltage wiring by the first contact point, wherein the first contact point is connected to the common voltage wiring which is provided on the second substrate;

wherein the common voltage wiring is configured to receive a common voltage applied from an external circuit; and wherein the first electrode and the second electrode are each connected to a corresponding contact point of the two second contact points by a connection wiring provided on the first substrate.

2. The mobile terminal of claim 1, wherein:
the display area further comprises a plurality of color filter layers;
each of the plurality of color filter layers form a pixel area; and
the plurality of color filter layers are arranged between the touch detection unit and the liquid crystal layer.

3. The mobile terminal of claim 2, wherein the plurality of color filter layers comprise a black matrix layer arranged between each of the plurality of color filter layers.

4. The mobile terminal of claim 2, wherein:
the display area further comprises a plurality of common electrodes; and
the plurality of common electrodes are positioned between the liquid crystal layer and the plurality of color filter layers.

5. The mobile terminal of claim 1, wherein the first electrode and second electrode are arranged such they cross each other.

6. The mobile terminal of claim 1, wherein the exposed area comprises driver integrated circuits (ICs).

7. The mobile terminal of claim 6, wherein:
the exposed area further comprises a flexible printed circuit board (FPCB);
the FPCB is configured to electrically connect to the first and second contact points; and
the FPCB comprises a touch IC configured to detect a signal or apply a voltage to the first and second electrodes.

8. The mobile terminal of claim 7, wherein the FPCB is bifurcated at a point and configured to electrically connect to the driver ICs.

9. The mobile terminal of claim 1 further comprising a first insulating layer and a second insulating layer, wherein:
the first insulating layer is arranged between the first and second electrodes; and
the second insulating layer is arranged between the second electrode and one or more subpixels.

10. The mobile terminal of claim 1, wherein the first and second electrodes comprise indium tin oxide (ITO), indium zinc oxide (IZO) or indium tin zinc oxide (ITZO).

11. A mobile terminal comprising: a first substrate and a second substrate arranged within a terminal main body and configured to face each other; a liquid crystal layer arranged between the first substrate and the second substrate; a touch detection unit coupled to the first substrate and arranged between the first substrate and the liquid crystal layer, wherein the touch detection unit comprises first and second electrodes; a contact point unit comprising a plurality of contact points configured to electrically connect to the touch detection unit and the first and second substrates; a plurality of color filter layers arranged to form a pixel area between the touch detection unit and the liquid crystal layer; and a plurality of common electrodes arranged between the liquid crystal layer and the plurality of the color filter layers; wherein the plurality of common electrodes are connected to a common voltage wiring by a first contact point of the plurality of contact points, wherein the first contact point is connected to the common voltage wiring which is provided on the second substrate; wherein the common voltage wiring is configured to receive a common voltage applied from an external circuit; and wherein the first electrode and the second electrode are each connected to a corresponding contact point of the plurality of contact points by a connection wiring which is provided on the first substrate.

12. The mobile terminal of claim 11 further comprising one or more driver integrated circuits (ICs) arranged in an exposed area.

13. The mobile terminal of claim 12 further comprising a flexible printed circuit board (FPCB), wherein:
the FPCB is configured to electrically connect to one or more of the plurality of contact points; and
the FPCB comprises a touch IC configured to detect a signal or apply a voltage to the first and second electrodes.

14. The mobile terminal of claim 13, wherein the FPCB is bifurcated at a point and configured to electrically connect to the one or more driver ICs.

15. The mobile terminal of claim 11, wherein the first electrode and second electrode are arranged such they cross each other.

16. The mobile terminal of claim 11, wherein the plurality of color filter layers comprise a black matrix layer arranged between each of the plurality of color filter layers.

17. The mobile terminal of claim 11 further comprising a first insulating layer and a second insulating layer, wherein:
the first insulating layer is arranged between the first and second electrodes; and
the second insulating layer is arranged between the second electrode and one or more subpixels.

18. The mobile terminal of claim 11, wherein the first and second electrodes comprise indium tin oxide (ITO), indium zinc oxide (IZO) or indium tin zinc oxide (ITZO).

* * * * *